United States Patent [19]

Satterfield

[11] Patent Number: 5,676,282
[45] Date of Patent: Oct. 14, 1997

[54] VOLUMETRICALLY VARIABLE MEASURING DISPENSER

[76] Inventor: Delbert Satterfield, 6043 Lonesome Pine, San Antonio, Tex. 78247-1133

[21] Appl. No.: 726,270

[22] Filed: Oct. 4, 1996

[51] Int. Cl.$^6$ ........................................ B65D 88/54
[52] U.S. Cl. ................................ 222/307; 222/362
[58] Field of Search .......................... 222/307, 362, 222/438, 456

[56] References Cited

U.S. PATENT DOCUMENTS

| | | | |
|---|---|---|---|
| 3,258,174 | 6/1966 | Mullen | 222/307 |
| 4,032,050 | 6/1977 | Funk | 222/362 X |
| 4,345,700 | 8/1982 | Souza | 222/438 |
| 4,691,821 | 9/1987 | Hofmann | 222/362 X |
| 5,542,579 | 8/1996 | Robbins, III | 222/456 X |

*Primary Examiner*—Gregory L. Huson
*Attorney, Agent, or Firm*—Gunn, Lee & Miller, P.C.

[57] ABSTRACT

A volumetrically variable measuring dispenser cap comprising three primary components; an adaptor section attachable to a container having an inlet port, a volume selection ring rotatably mounted on the adaptor and having a closure plate of a size sufficient to cover the inlet port on the adaptor when appropriately rotated, and having a movable wall extending upward from the closure plate and finally, a rotatable chamber captively mounted to the volume selection ring having an inner cavity and a cover cap to close off the inner cavity. The device operates by movement of the selection ring so as to rotate the movable wall to a position within the inner cavity. The container to which the dispenser is attached is then inverted such that the material within the container falls through the inlet port in the adaptor, through the selection ring, and into the defined volumetric inner cavity. Once an amount has been thus directed into the inner cavity, the selection ring and the rotatable chamber are then rotated so as to seal off the inlet port of the adaptor. The container to which the dispenser is attached is then turned upright with the material within the inner cavity held between the adaptor section and the cover cap. To dispense the material, the cap to the cover section is flipped open, exposing the inner cavity and permitting the user to dispense the measured amount.

1 Claim, 2 Drawing Sheets

VOLUMETRICALLY VARIABLE MEASURING DISPENSER

BACKGROUND OF THE INVENTION

1. Field of the Invention

The present invention relates generally to dispensing devices for use in conjunction with containers for food products and the like. The present invention relates more specifically to a dispensing cap for measuring a quantity of a substance contained within a container and for dispensing only such quantity as is required.

2. Description of the Related Art

It is well known in many fields, where use of granular or powdered materials is required, to measure such materials by means of fixed volume measuring utensils. In fields such as cooking substances such as spices, herbs, flours and so on, are frequently dispensed from containers and measured for the purpose of cooking or baking a particular food product. These measurements are often made by way of preset teaspoon and tablespoon volume measuring devices. Likewise, in fields such as chemistry and chemical engineering, compositions are mixed and made using measured amounts of various component compounds. These component compounds are often measured and dispensed into a mixing container by way of preset volume measuring devices such as spoons, pipettes, measuring tubes, measuring cups and the like. In most instances, these preset measuring devices are utensils that are separate and apart from the containers which hold the materials to be measured.

In some instances in the prior art, attempts have been made to incorporate measuring devices into or onto the container which holds the material to be measured. Such efforts have been as simple as having volume measurements on the side of the container so that when an amount is dispensed, a change in the volume of the material within the container can be determined. More complicated efforts to provide a means for measuring an amount of material to be dispensed have involved caps or covers for the container that selectively retrieve a measured amount of material before then being dispensed from the container to be used. Some examples of previous attempts at providing measuring devices as described above include the following:

U.S. Pat. No. 4,345,700, issued to Souza on Aug. 24, 1982, entitled "Variable Quantity Dispensing Device For Granular Material". This patent describes a four-piece cap that includes a bottom cover with a material inlet, a top cover with a material outlet, and a complicated coffer section with a movable inner wall that varies the volume of the coffer between the upper and lower lids.

U.S. Pat. No. 4,560,092, issued to Souza on Dec. 24, 1985, entitled "Variable Quantity Dispensing Device for Granular Material", further includes an axially mounted stirrer in addition to a movable interior wall that varies the volume of a coffer section. Again, there is an inlet lid and outlet lid, each with offset ports.

U.S. Pat. No. 4,174,058, issued to Bassignani on Nov. 13, 1979, entitled "Material Measuring Dispensing Device", discloses an even more complicated system that includes not only upper and lower lid sections, but a push-button means for rotating these sections during the dispensing of the product. Basstgnani further includes a rotatable wall section used in conjunction with a cylindrical coffer that incorporates detentes and a push-button detente release for setting the wall at a variety of volumetric positions.

U.S. Pat. No. 3,129,853, issued to Hoskins on Apr. 21, 1964, entitled "Granular Material Dispensing Device" also incorporates upper and lower lids with offset inlet and outlet portals as well as an interior coffer section that rotates between the two lids. This device, however, does not anticipate variations in the volume of the interior of the coffer.

U.S. Pat. No. 3,245,589, issued to Temliak on Apr. 12, 1966, entitled "Medical Dispenser," describes a container and lid/dispenser for medicine tablets and pills with a rotatable coffer capable of receiving one or more of the medicine tablets from the interior of the container. Further rotation of the coffer dispenses the tablet at a side portal on the lid of the container.

U.S. Pat. No. 3,884,397, issued to Andersson on May 20, 1975, entitled "Apparatus for Feeding Material to a Gas Generator", describes a device with inlet and outlet ports on the top and bottom of a measuring chamber. The chamber itself has independently movable segmented partitions that block or open the portals and vary an intermediate volume between the segments.

U.S. Pat. No. 4,102,477, issued to Yoon on Jul. 25, 1978, entitled "Sugar Dispensing Apparatus", describes a cap capable of measuring out quantities of sugar from a container. An interior wall is initially positioned with a knob from the outside of the container after which the opening for the container is released to dispense the material contained within the variable volume of the lid. The Yoon device rotates on an axis transverse to the opening of the container as opposed to most of the referenced art which describes cap rotation that is co-axial with the container.

Efforts in the past to provide a volumetrically variable dispensing lid for a container have suffered in two main respects, accuracy and simplicity. Complex structures tend to be more accurate in their delivery of material but because of their complexity often become clogged and difficult to operate. Breakage in complex structures also is a problem.

Simpler devices that might be more reliable in their operation tend to be less accurate in their dispensing of the product. It would be desirable, therefore, to have a volumetrically variable measuring dispenser suitable for placement as a lid on a container for granular and powdered products that is simple in construction, easy to operate, and accurate in its product delivery. It would be preferable that the dispensing cap construction be of molded plastic or the like and incorporate easily-adjustable rotating components. It would preferable that the construction of the cap would be economical enough to incorporate the device onto disposable containers for food products and the like. It would also be desirable to manufacture the product in sizes appropriate for the replacement of standard caps onto existing food product; containers that might require the product be measured in standard volumetric amounts.

SUMMARY OF THE INVENTION

It is therefore an object of the present invention to provide a device for use in conjunction with containers to dispense from the container a measured quantity of granular, particulate, or powdered substance.

It is a further object of the present invention to provide a container having a device for dispensing measured quantities of granular, particulate, or powdered substances contained within the containers.

It is a further object of the present invention to provide a device for dispensing from a container a volumetrically variable measured quantity of granular, particular, or powdered substances contained within the container.

It is a further object of the present invention to provide a dispensing device that is simple in construction, easy to operate, and not subject to fouling or contamination through repeated use.

It is a further object of the present invention to provide a dispensing device capable of accurately selecting a specific, standard, volumetric quantity and thereafter accurately dispensing that quantity of material from a container associated with the dispenser.

It is a further object of the present invention to provide a volumetrically variable dispensing cap for a container whose manufacturing cost is sufficiently low so that it might be incorporated into disposable or recyclable units for marketing in conjunction with the retail sales of food products.

In fulfillment of these and other objectives, the present invention provides a volumetrically variable measuring dispenser cap comprising three primary components. Included is an adaptor attachable to a container having a semi-circular inlet port. Also included in the cap is a volume selection ring rotatably mounted on the adaptor and having a closure plate of a size sufficient to cover the inlet port of the adaptor when appropriately rotated. In addition, the rotatable ring has a movable wall extending upward from the closure plate. Finally, a third component of the cap defines a rotatable chamber captively mounted to the rotatable ring surrounded by a cylindrical wall and having an inner cavity as well as a cover cap to close off the inner cavity.

The device operates by an appropriate movement of the rotatable ring so as to rotate the movable wall attached to the ring to a position within the inner cavity in the rotatable chamber section so as to define a specified volume. The container to which the dispenser is attached is then inverted such that the material within the container falls through the inlet port in the adaptor section through the rotatable ring section and into the defined volumetric inner cavity in the rotatable chamber section of the dispenser. Once an amount has been thus directed into the inner cavity of the rotatable section, this section is then rotated so as to seal off the inlet port of the adaptor. The container to which the dispenser is attached is then again turned upright with the material within the inner cavity held between the adaptor section and the cover cap of the rotatable chamber section. To dispense the material, the cover cap to the rotatable chamber section is flipped open, exposing the inner cavity in the rotatable chamber section and permitting the user to dispense the measured amount of material without opening any access to the balance of the material within the container.

It is anticipated that the description and the drawings included herein are but the best mode example of the implementation of the device of the present invention. It is anticipated that a number of alternative embodiments to the invention could be anticipated after a review of the details of the example provided.

DETAILED DESCRIPTION OF THE PREFERRED EMBODIMENT

Figure 1:
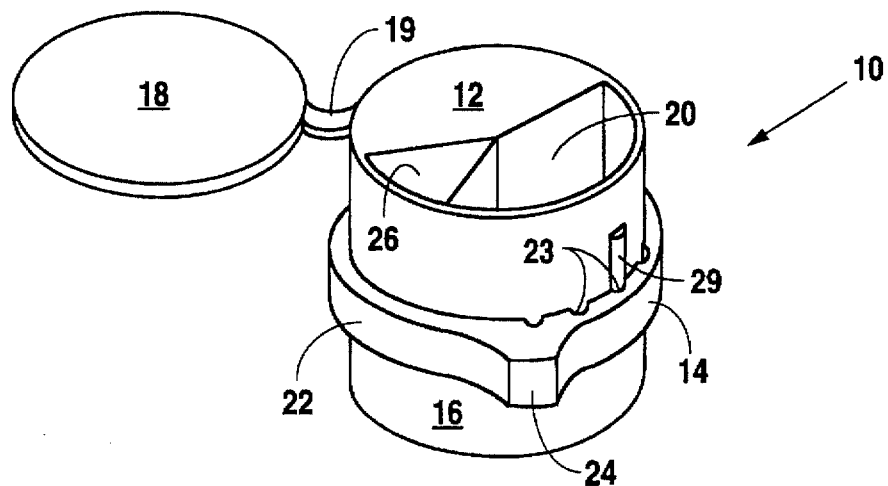
FIG. 1 is a perspective view of the assembled device of the present invention.

Reference is made first to FIG. 1 for a general description of the assembled structure of the present invention. Dispenser cap (10) is comprised primarily of rotatable chamber section (12), rotatable ring section (14), and adaptor section (16). Rotatable chamber section (12) defines inner cavity (20) and incorporates cover cap (18). Rotatable ring (14) incorporates guide ring (22) and knob (24). In addition, attached to rotatable ring (14) at a point not visible in FIG. 1 is wedge wall (26) that is capable of moving within inner cavity (20) of rotatable chamber section (12).

Figure 2:
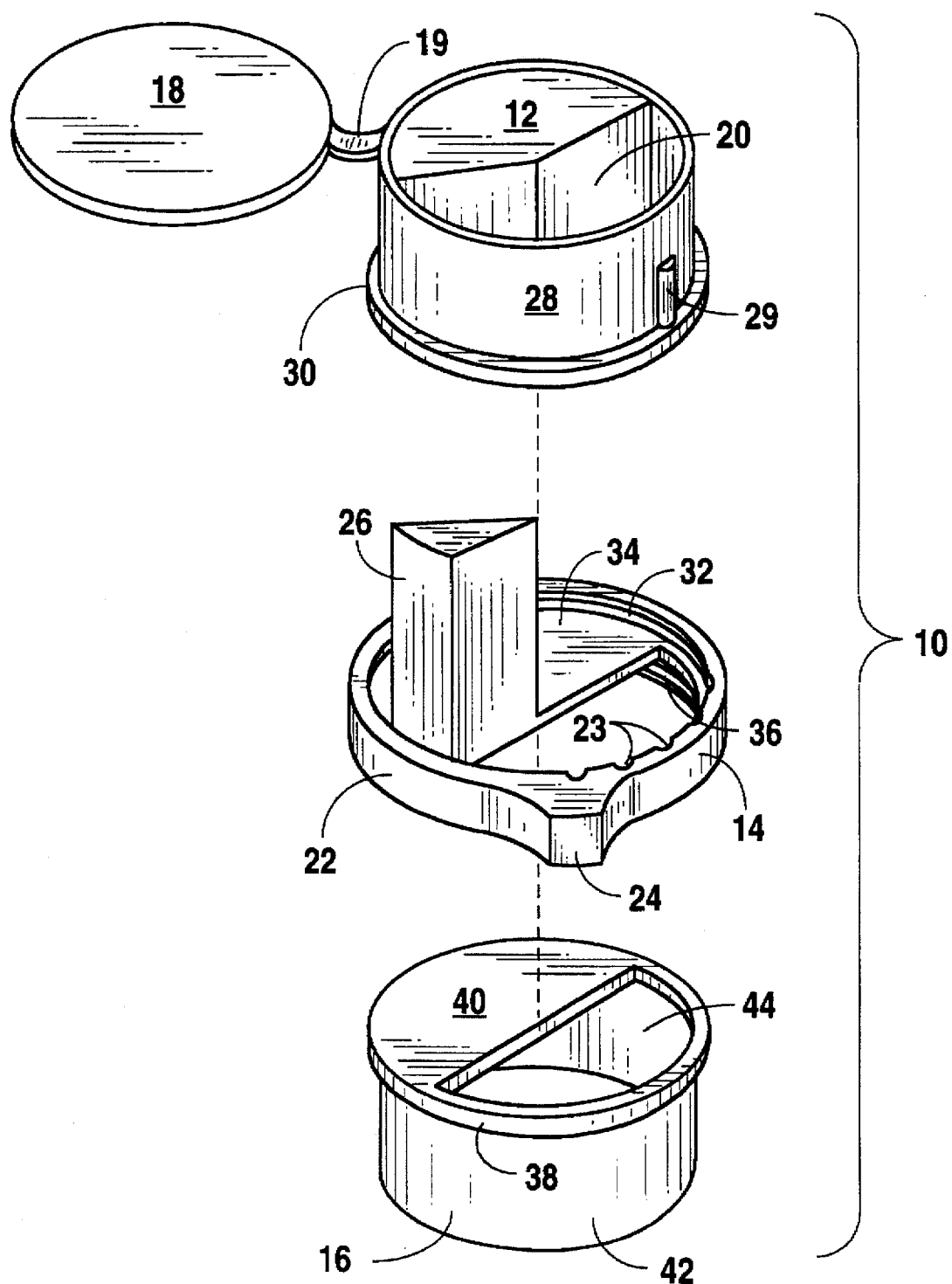
FIG. 2 is an exploded perspective view of the device of the present invention showing each of the three primary components.

Reference is made next to FIG. 2 for a more detailed description of the structures of each of the primary components of the present invention. In the exploded view shown in FIG. 2, measuring dispenser (10) is comprised of primary elements; rotatable chamber section (12), rotatable ring section (14) and adaptor section (16).

Rotatable chamber section (12) defines inner cavity (20) way of chamber wall (28). Peripheral to chamber wall (28) is guide ridge (30) which, as described in more detail below, is insertable into rotatable ring section (14). Attached to rotatable chamber section (12) by way of flexible hinge (19) is cover cap (18) which snaps in place over an upper peripheral edge of chamber wall (28). In addition, key ridge (29) is molded into chamber wall (28) and functions to select the volume of inner cavity (20) as described in more detail below.

Rotatable ring section (14) is comprised of guide ring (22) and knob (24) which, when the device is assembled as shown in 1, are exposed on the exterior of the measuring dispenser (10). In the exploded view shown in FIG. 2, the remaining components of rotatable ring (14) are visible. In addition to wedge wall (26), barrier (34) covers approximately half of the otherwise open area through guide ring (22). On either side of barrier (34) are guide grooves formed into the inner wall of guide ring (22). Guide groove (32) is configured to receive guide ridge (30) on rotatable chamber section (12). Likewise, guide groove (36) is configured to receive guide ridge (38) described in more detail below with respect to adaptor section (16). In this way, rotatable chamber section (12) may coaxially rotate with respect to rotatable ring section (14) and remain captively attached thereto. Likewise, rotatable ring section (14) may rotate with respect to adaptor section (16) and remain captively attached thereto.

As indicated above, barrier (34) extends over only half of an open area defined by guide ring (22). The remaining open area within guide ring (22) serves to provide an inlet portal for material to flow into inner cavity (20) when the device is assembled. On an interior edge of guide ring (22) are formed detente indentions (23) which are configured to receive and match the structure of key ridge (29) shown on rotatable chamber section (12). When rotatable chamber section (12) is matched with ring section (14) with guide ridge (30) inserted into guide groove (32), the selectable rotation of the two components is facilitated by the positioning of key ridge (29) into one of indents (23).

Adaptor section (16) is a simple cylindrical section defined by adaptor wall (42) and partially closed by barrier (40). Barrier (40) covers approximately one-half of an otherwise open aperture through adaptor section (16). The remaining half forms inlet portal (44) through which the material may pass when it is to be dispensed.

As indicated above, guide ridge (38) of adaptor section (16) fits into guide groove (36) of ring section (14), such that the two components may rotate coaxially with respect to each other and remain captively attached.

Figure 3:
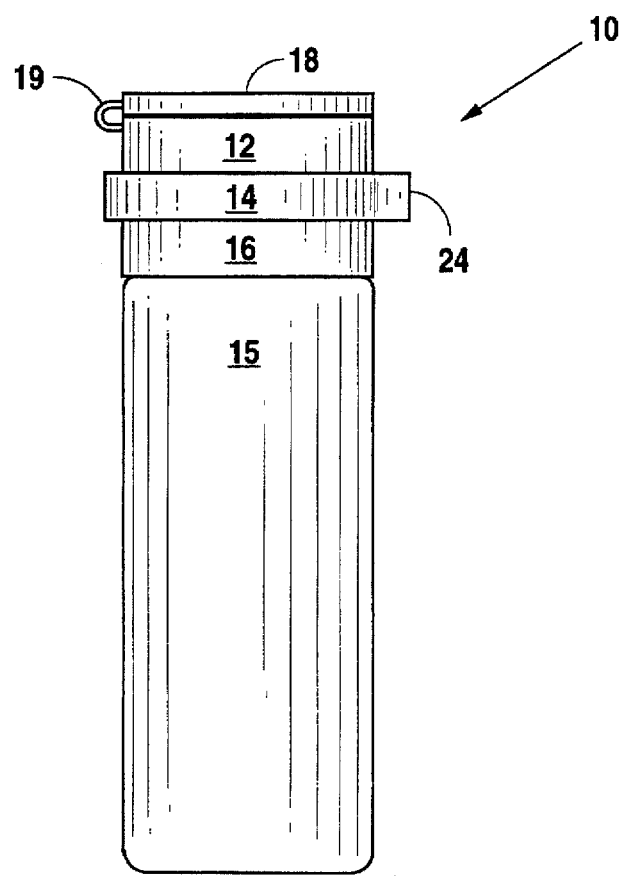
FIG. 3 is a side view of the device of the present invention in place on a typical container.

Reference is made briefly to FIG. 3 for a description of the attachment of the device of the present invention to a typical container. In FIG. 3, container (15) is shown with adaptor section (16) as it might be attached to the top thereof. Ring section with knob (24) is shown as it is positioned rotatably attached to adaptor section (16). Likewise, rotatable chamber section (12) with cover cap (18) is shown as it would be attached to ring section (14). Container (15) could be any of a variety of sizes with appropriate modifications in the geometry of dispensing device (10) implemented. An interior wall of adaptor section (162). incorporates molded threads to facilitate the attachment of dispensing device (10) to container (15). Standard thread sizes in the industry would be molded in this fashion to the interior wall of adaptor section (16).

Reference is now made back to FIGS. 1 and 2 for a detailed description of the function of the device of the present invention. Once assembled as shown in FIG. 1, dispensing device (10) is attached to a container as shown in FIG. 3. With cover cap (18) closed over top of chamber section (12), the user engages knob and rotates the combination of chamber section (12) and ring section (14) so as to position barrier (34) over barrier (40) in adaptor section (16). This opens inlet port (44) to inner cavity (20). Cover cap (18) keeps inner cavity (20) closed to the outside.

With ring section (14) held in this position, chamber section (12) is rotated alone so as to vary the position of wedge wall (26) within inner cavity (20). In this way, the volume of inner cavity (20) that remains open through portal (44) to the material inside the container is either increased or decreased. Key ridge (29) sets this volume in any of a number of preselected amounts by way of engaging indents (23) on guide ring (22). For example, in the preferred embodiment, indents (23) on guide ring (22) would define volumes within inner cavity (20) equal to ⅛ tsp., ¼tsp., ½ tsp., ¾ tsp., 1 tsp., 1¼ tsp., 1½ tsp., 1¾ tsp., 2 tsp., 2½ tsp., and 1 Tsp. increments. Appropriate indicators on ring section (14) identify each of these indentation selections. Once a volume for inner cavity (20) has been defined through the movement of wedge wall (26), the container with its still closed cap may be inverted so as to feed byway of gravity the material within the container through portal (44) into inner cavity (20), or at least that portion of inner cavity (20) that remains open after the placement of wedge wall (26). A few taps on the container would serve to fill inner cavity (20) to the premeasured amount. In this inverted position, the combination of rotatable chamber section (12) and rotatable ring section (14) are again rotated with respect to adaptor section (16). This time, barrier (34) on ring section (22) is rotated so that it fully obstructs inlet port (44). In so doing, barrier (34) cuts through the material held within inner cavity (20) and closes it off. The measured amount is now fully held within inner cavity (20). The container and dispenser (10) may then be returned to an upright position since the material is now held captive within inner cavity (20). In the alternative, the material may be immediately dispensed from inner cavity (20) by way of opening cover cap (18) on rotatable chamber section (12). In either case, the material held within inner cavity (20) is then free to be released therefrom out of rotatable section (12). The amount of material released is defined by the variable volume of inner cavity (20).

The present invention provides a simple device with only three parts, two moving and one stationery with respect to the container, and is an effectively accurate means for varying the volume of material to be dispensed. Many of the drawbacks to the designs in the prior art are eliminated by providing a fully open chamber on the outlet side of the dispenser. Within the chamber itself, there are no lips or edges for granular substances to be trapped on. The sides of the chamber that permit the dispensing of the material are parallel and straight so as to prevent any material from remaining within the inner cavity. The metering cavity is adjusted through the rotation of the components of the device, but after a volume is fixed and the cavity is filled, it is not again orbitally moved to any other position for dispensing. In many instances in the prior art, movement of the material within the cavity further complicates operation of the device through fouling of the mechanisms associated with the various components. In the present invention, the material within the cavity moves only twice, once when it is permitted to fall into the cavity and again when it is permitted to exit the cavity. The present invention also permits a measured amount to remain captive within the cavity for an indefinite period of time or to be immediately dispensed after measurement. In addition, after a measured amount has been released from the cavity, the material within the container remains sealed beneath the barriers of ring section (14) and adaptor section (16). In this manner, even if cover cap (18) remains open after dispensing, no contamination of the remaining material within the container will occur.

As indicated above, it is anticipated that the structures of the present invention could be adapted both in scale and geometry to fit any of a number of standard-sized food product or chemical containers. In the preferred embodiment, the components of the present invention are made of molded plastic flexible enough to permit the insertion of guide ridges (30) and (38) into guide grooves (32) and (36) respectively. In this manner, rotatable chamber section (12) snaps into place on ring section (14) and the combination of those two components snap on top of adaptor section (16). Likewise, cap cover (18) is structured so as to snap tightly and adhere to the top portion of rotatable chamber section (12). The structures of the present invention are adaptable to the opening size of any of a variety of containers both with threaded tops or snap-on tops.

The indents (23) positioned about guide ring (22) could be varied in their position according to the units of measurement to be utilized. For example, in chemical engineering applications, materials are often dispensed volumetrically in milliliters, centiliters, and deciliters. The indents could be positioned and marked to reflect such volumetric measurements.

While the preferred embodiment has been described with respect to use of the device in conjunction with particulate and powdered materials, it is anticipated that with appropriate modifications and variously positioned seals, the device of the present invention in its basic structure could be utilized in conjunction with liquids and the like. O-ring seals could be positioned, for example, within guide grooves (32) and (36) so as to seal off the peripheral edges of ring section (14). Appropriate lubrication on these O-rings would still permit the rotation of the various components one against the other. Likewise, adaptor section (16) and cover cap (18) would incorporate appropriate sealed edges, such that when in their closed position, no leakage would occur therefrom. Likewise, wedge wall (26) would incorporate corner edges that seal against chamber wall (28) to define inner cavity (20). In this manner, all edges of inner cavity (20) would be appropriately sealed against leakage of liquids.

It is anticipated that further alterations and embodiments of the present invention will be anticipated by those skilled in the art from a reading of this description of the preferred embodiment. The hereinafter appended claims are intended to cover and include these alternative embodiments.

I claim:

1. A device for attachment to a container as a closure to said container, for dispensing a volumetrically variable amount of material contained within said container, said device comprising:

- an adaptor section for attachment to said container, said adaptor section comprising a first partial barrier wall, said first partial barrier wall defining a fixed position inlet port;
- a rotatable ring section attachable to and coaxially rotatable with said adaptor section, said ring section comprising a second partial barrier wall and defining a passage port, said second partial barrier wall positioned generally parallel to said first partial barrier wall of said adaptor section and rotatable with respect thereto so as to partially or fully cover said inlet port of said adaptor section, said ring section further comprising a movable cavity wall projecting perpendicular to said second partial barrier wall; and
- a rotatable chamber section, said chamber section comprising a peripheral wall defining an inner cavity with an open lower face and open upper face, said rotatable chamber section attachable to and coaxially rotatable with said ring section, such that said passage port of said ring section may align with said open lower face of said inner cavity, said chamber section further comprising a closure cap hingedly attached to said peripheral wall and positionable over said inner cavity so as to close or leave open said inner cavity;
- wherein a first rotated position, passage of said material from said container is permitted through said inlet port and said passage port into said inner cavity, and is prevented from further flow by said cover cap positioned over said inner cavity, said cavity wall movable within said inner cavity to vary a volume of said cavity and thereby vary a volume of said material to be dispensed.

* * * * *